(12) United States Patent  
Ou

(10) Patent No.: US 11,987,178 B2  
(45) Date of Patent: May 21, 2024

(54) LIGHT ASSEMBLY WITH A FAIL SAFE MODE FOR A LOW BEAM FUNCTION

(71) Applicant: VALEO VISION, Bobigny (FR)

(72) Inventor: Rujiu Ou, Foshan (CN)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 18/258,400

(22) PCT Filed: Dec. 21, 2020

(86) PCT No.: PCT/CN2020/138073  
§ 371 (c)(1),  
(2) Date: Jun. 20, 2023

(87) PCT Pub. No.: WO2022/133670  
PCT Pub. Date: Jun. 30, 2022

(65) Prior Publication Data  
US 2024/0034235 A1 Feb. 1, 2024

(51) Int. Cl.  
*B60Q 11/00* (2006.01)  
*H05B 45/325* (2020.01)  
*H05B 45/54* (2020.01)

(52) U.S. Cl.  
CPC ......... *B60Q 11/002* (2013.01); *H05B 45/325* (2020.01); *H05B 45/54* (2020.01); *B60Q 2300/146* (2013.01)

(58) Field of Classification Search  
CPC ............ B60Q 11/002; B60Q 2300/146; H05B 45/325; H05B 45/54  
See application file for complete search history.

(56) References Cited

U.S. PATENT DOCUMENTS

| | | | |
|---|---|---|---|
| 10,292,221 | B2 | 5/2019 | Matsumoto |
| 10,661,704 | B2 | 5/2020 | Yasuda |
| 10,849,204 | B2 | 11/2020 | Hara et al. |
| 10,899,269 | B2 | 1/2021 | Tomono et al. |
| 2018/0098393 | A1 | 4/2018 | Matsumoto |
| 2020/0094730 | A1 | 3/2020 | Yasuda |
| 2020/0148096 | A1 | 5/2020 | Tomono et al. |
| 2020/0178367 | A1 | 6/2020 | Hara et al. |

FOREIGN PATENT DOCUMENTS

| | | |
|---|---|---|
| CN | 107889305 A | 4/2018 |
| CN | 110939913 A | 3/2020 |
| CN | 111182692 A | 5/2020 |
| CN | 210554465 U | 5/2020 |
| JP | 2010-241347 A | 10/2010 |

OTHER PUBLICATIONS

International Search Report dated Sep. 24, 2021 in PCT/CN2020/138073 filed on Dec. 21, 2020, 4 pages.

*Primary Examiner* — Jason M Han  
(74) *Attorney, Agent, or Firm* — Oblon, McClelland, Maier & Neustadt, L.L.P.

(57) ABSTRACT

A light assembly includes a power source, a first lighting module to perform a high beam function, a second lighting module to perform a low beam function and a driver connected to the voltage source. The driver is connected to a first pin, a second pin and a third pin and is configured to apply a first power output to a first lighting module and to apply a second power output to the second lighting module. The light assembly includes a first switching unit in series with the first lighting module and the second lighting module, and a second switching unit in series with the second lighting module.

20 Claims, 2 Drawing Sheets

[Fig 1]
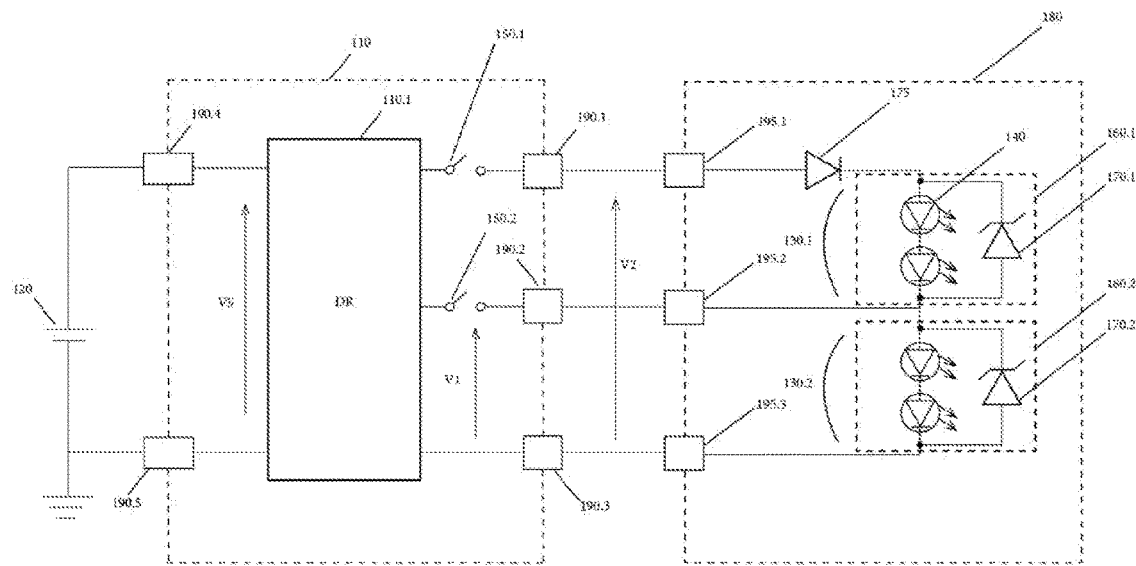
[Fig 2]
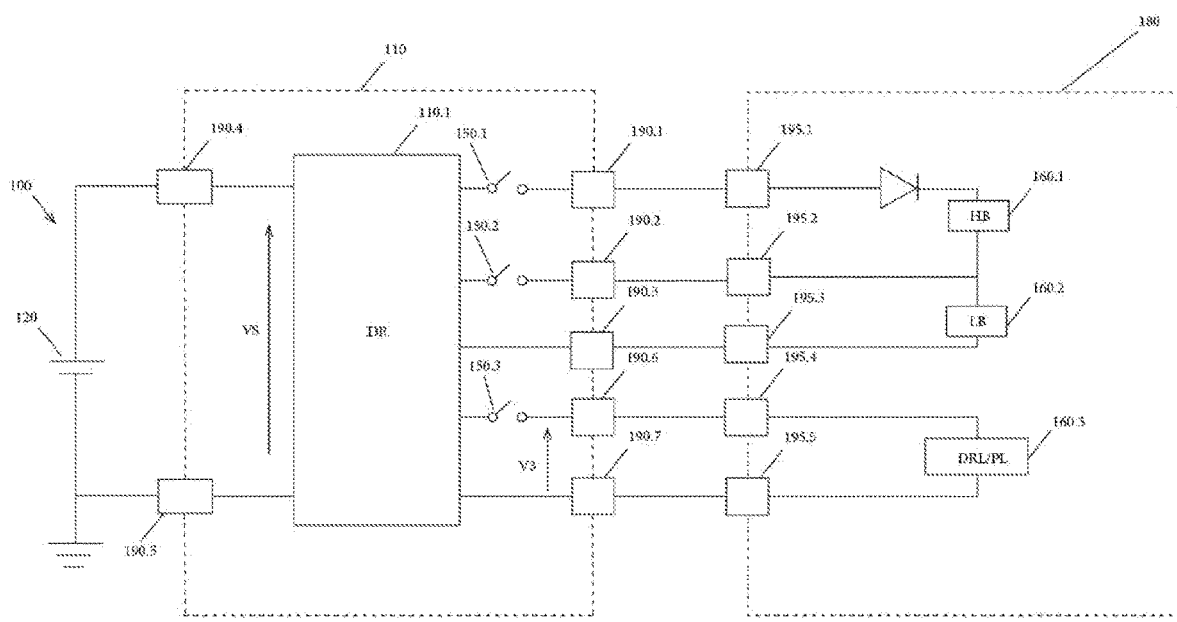

[Fig 3]
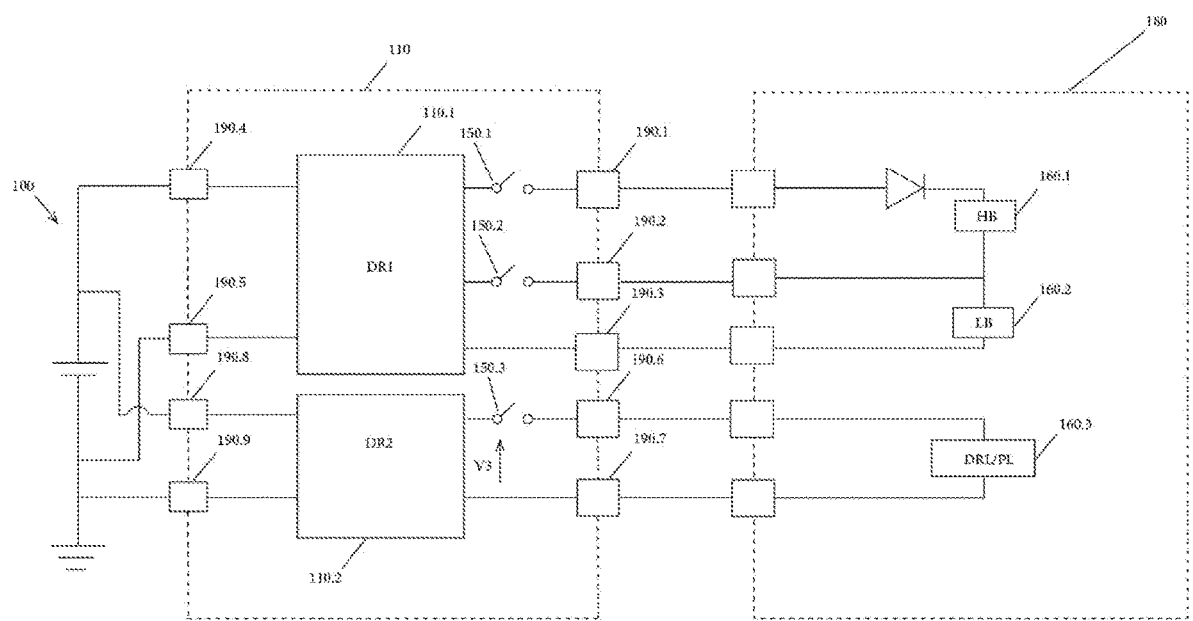

LIGHT ASSEMBLY WITH A FAIL SAFE MODE FOR A LOW BEAM FUNCTION

The present invention concerns the technical field of lighting. It concerns in particular, while not exclusively, a light assembly comprising lighting modules in a headlamp such as a vehicle headlamp.

It is advantageous in the case where several lighting functions are to be performed by a single light assembly.

The Japanese patent JP5396134B2 discloses a light assembly for a vehicle comprising a DC/DC driver and three lighting functions including high beam HB, low beam LB and daytime running light DRL, using respective modules. A switch mounted in parallel to the HB module is used to turn on and off the HB function. However, when the switch is in open-circuit and cannot turn on, the HB function cannot be deactivated without deactivating the LB function. This means that the LB function cannot be activated alone when a fail status of the switch mounted in parallel to the HB module occurs (blocked in an open-circuit position for instance), which raises major safety issues, notably because it is generally considered that in a fail-safe mode, only LB function should be activated.

The present invention improves the situation.

To this end, a first aspect of the invention concerns a light assembly comprising:
- a power source;
- a first lighting module configured to perform a high beam function;
- a second lighting module configured to perform a low beam function;
- a driver connected to the power source.

The driver is connected to a first pin, a second pin and a third pin, and is configured to provide a first power output between the second pin and the third pin and to provide a second power output between the first pin and the third pin, the first lighting module is connected between the first pin and the second pin and the second lighting module is connected between the second pin and the third pin, and the light assembly comprises a first switching unit in series with the first lighting module and the second module, and a second switching unit in series with the second lighting module.

Therefore, according to the invention, there is no switch in parallel to the HB function and the safety problem detected in the prior art is solved, by placing the HB function in high side position. This enables to perform a fail-safe mode for the LB function, which is maintained even in case of failure, such as a failure on the first switching unit.

According to some embodiments, the first switching unit can be located between the driver and the first pin and the second switching unit can be located between the driver and the second pin.

This allows to control the lighting functions on the driver side, such as in a driver block dedicated to powering and control. The lighting modules may then be located in a headlamp without the need to have a control circuit in the headlamp.

According to some embodiments, the first lighting module may comprise a first series of LEDs and the second lighting module comprises a second series of LEDs.

Using LEDs enables to have a good lighting performance with acceptable costs.

In complement, the first lighting module may comprise a first protection diode in parallel to the first series of LEDs and mounted in reverse, and/or the second lighting module may comprise a second protection diode in parallel to the second series of LEDs and mounted in reverse.

This allows to protect the LEDs of the lighting modules. In particular, it prevents a current to flow through the LEDs in reverse.

According to some embodiments, the light assembly may further comprise a third protection diode between the first switching unit and the first lighting module.

This allows to maintain the LB function in the case where there is a short circuit to ground between the first pin and the first lighting module For instance, such a situation may arise on when chip supporting the first lighting unit is short-circuited to the ground (low impedance or low voltage drop). The safety associated with the light assembly is therefore improved.

According to some embodiments, the first and second lighting modules may be included in a headlamp.

In complement, the third protection diode may be inside the headlamp.

This enables to maintain the LB function when there is a short circuit at an input pin of the headlamp.

According to some embodiments, the light assembly may further comprise a third lighting module configured to perform a position lighting function and/or a daytime signaling function.

The light assembly is therefore configured to perform at least three lighting functions using the same power source. Alternatively, the third lighting module may be configured to perform a Turn Indicator, TI function, a fog lighting function, or any other lighting/signaling function.

In complement, the driver may be further configured to apply a third power output between two additional pins, to which the third lighting module is connected.

The light assembly is therefore configured to perform at least three lighting functions using the same voltage source and a single driver.

Alternatively, the driver may be a first driver and the assembly may further comprise a second driver arranged for providing a third power output to the third lighting module.

By using two separate drivers for controlling different sets of functions, it allows a more flexible combination of lighting functions in the light assembly.

In complement, the light assembly may further comprise a third switching unit in series with the third lighting module.

This allows to control activation and deactivation of the PL/DRL function.

According to some embodiments, the first switching unit and/or the second switching unit may be controlled by Pulse Width Modulation, PWM, signals, to vary the power provided to the first and second lighting modules, and/or to the second lighting module, respectively.

This allows to increase the flexibility associated with the lighting functions. The power can for example be adapted to external conditions, such as brightness for example.

Other features and advantages of the invention are made explicit from the description detailed hereafter, and from the attached drawings, on which:

FIG. 1 shows a light assembly according to some embodiments of the invention;

FIG. 2 shows a light assembly for performing at least three lighting functions, according to one embodiment of the invention;

FIG. 3 shows a light assembly for performing at least three lighting functions, according to another embodiment of the invention.

FIG. 1 illustrates a light assembly 100 according to some embodiments of the invention.

The light assembly comprises a power source 120 and a driver 110.1. The power source 120 may be a voltage source or a current source according to the invention. In what follows, the example of a voltage source is considered, for illustrative purposes only.

The power source 120 may be a DC voltage source and the driver 110.1 may be a DC/DC driver. Alternatively, the power source 120 may be an AC voltage source and the driver 110.1 may be an AC/DC driver.

The power source 120 is configured to generate a source power input, such as a source voltage Vs to be provided at least to the first DC/DC driver 110.1.

The first driver 110.1 is configured to provide a first power output, such as a first voltage V1 between outputs pins 190.2 and 190.3 of a driver block 110, and a second power output, such as the second voltage V2 between output pins 190.1 and 190.3. Alternatively, the first power output may be a first current output and the second power output may be a second current output.

No restriction is attached to the number of pins of the driver block 110. On FIG. 1, five pins have been represented: the three output pins 190.1, 190.2 and 190.3 and input pins 190.4 and 190.5 that are connected to the power source 120.

The light assembly 100 according to the invention further comprises a first lighting module 160.1 arranged for performing a first lighting function and a second lighting module 160.2 arranged for performing a second lighting function. In what follows, the first function is a high beam, HB, function and the second function is a low beam, LB, function, which are complementary functions. This means that HB and LB functions can be activated at the same time, and that LB can be activated alone. However, the function HB is not to be activated without LB.

The first lighting module 160.1 and the second lighting module 160.2 may be integrated in a headlamp 180, such as a vehicle headlamp for example.

The first lighting module 160.1, hereafter HB module 160.1, may comprise a first series 130.1 of lighting units 140 and the second lighting module 160.2, hereafter LB module 160.2, may comprise a second series 130.2 of lighting units 140. The lighting units 140 can be any technology able to emit light when a voltage is applied to it. In what follows, the example of diodes such as LEDs is considered, for illustrative purposes only. The wording «LED» is therefore used to replace «lighting unit» in what follows, without departing from the fact that the lighting unit can encompass other technologies than LED.

No restriction is attached to the number of LEDs 140 per function. In the example shown on FIG. 1, the LB and HB functions are implemented by respective series 130.1 and 130.2 of two LEDs 140. However, according to the invention, the LB and HB functions can be implemented by any numbers n1 and n2 of LEDs 140, n1 and n2 being integers equal to or greater than 1.

As shown on FIG. 1, the LB lighting module 160.2 is connected between output pins 190.2 and 190.3 of the driver block 110 and the HB lighting module 160.1 is connected between output pins 190.1 and 190.2 of the driver block 110. Therefore, output pin 190.2 is both the minus terminal of the HB lighting module 160.1 and the plus terminal of the LB lighting module 160.2.

Alternatively, the output pin 190.2 may comprise two separate pin connectors one being connected to the minus terminal of the HB lighting module 160.1 and the other being connected to the plus terminal of the LB lighting module 160.2, these two pin connectors being connected inside the first driver to form the output pin 190.2. This may facilitate assembling the first driver and the other components of the light assembly.

The output pin 190.1 is the plus terminal of the HB lighting module 160.1 and the output pin 190.3 is the minus terminal of the LB lighting module 160.2.

So as to selectively activate/deactivate the LB and HB functions, the light assembly 100 may further comprise a first switching unit 150.1 and a second switching unit 150.2.

The first switching unit 150.1 is arranged for disconnecting the plus terminal of the HB lighting module 160.1, whereas the second switching unit 150.2 is arranged for disconnecting the plus terminal of the LB lighting module 160.2.

This is different from the architecture according to the prior art, where there is a switch in parallel to the HB function.

The light assembly 100 according to FIG. 1 allows to control the HB and LB functions as complementary functions, where the HB function can be activated in addition to the LB function, and where the LB function can be activated without the HB function. Indeed:
  to activate the LB function only, the second switching unit 150.2 is closed, and a first power output, such as a first voltage V1 is applied between output pins 190.2 and 190.3;
  to activate both the LB and HB functions, the first switching unit 150.1 is closed and the second switching unit 150.2 is open, and a second power output, such as a second voltage V2 is applied between output pins 190.1 and 190.3;
  to deactivate both the LB and HB functions, both first and second switching units 150.1 and 150.2 are open.

The first and second switching units 150.1 and 150.2 can be controlled by an external control unit, which is not represented on FIG. 1. No restriction is attached to such control unit, which can be a microprocessor arranged for processing command signals and to control the switching units 150.1 and 150.2 accordingly.

No restriction is attached to the technologies used for the switching units, which can for example be electronic switches, such as a transistors (N-MOS, P-MOS, MOSFET or IGBT for example). Alternatively, each of the switching units can be a bipolar transistor, a power diode, or can even be a mechanical switch.

According to the architecture of the prior art, when a switch in parallel to the HB module is broken, the HB function cannot be turned off, unless the HB and LB functions are turned off at the same time, which is not acceptable in terms of security.

The light assembly 100 according to the invention avoids this situation as there is no switch in parallel to the HB lighting module 160.1. If the first switching unit 150.1 is broken, the HB function cannot be activated, but there is no risk of an unwanted situation where LB and HB functions are both activated upon activation of the LB function only.

So as to protect the first series 130.1 of LEDs, the HB lighting module 160.1 may further comprise a first protection diode 170.1 in parallel to the first series 130.1 of LEDs and mounted in reverse compared to the LEDs of the first series 130.1.

So as to protect the second series 130.2 of LEDs, the LB lighting module 160.2 may further comprise a second protection diode 170.2 in parallel to the second series 130.2 of LEDs and mounted in reverse compared to the LEDs of the second series 130.2.

The first and second protection diodes 170.1 and 170.2 may be Zener diodes or a Transient-Voltage-Suppression, TVS, diodes, for example. In case of current inversion, the protection diodes avoid the current to go through the series of LEDs in reverse, thereby avoiding damaging the LEDs.

The output pins 190.31, 190.2 and 190.3 of the driver block 110 are respectively connected to the pins 195.1, 195.2 and 195.3 of the headlamp 180.

When the first lighting module 160.1 comprises the protection diode 170.1, there is a risk of current leakage when the pin 195.1, the pin 190.1 or any part of the circuit located between the first switching unit 150.1 and the first lighting module 160.1, is short-circuited to the ground. In that situation, the LB function cannot be activated, because each time the second switching unit 150.2 is closed, the current flows through the first protection diode 170.1 instead of through the second series 130.2 of LEDs. This risk in unacceptable is terms of security.

To avoid this, the light assembly 100 may further comprise a third protection diode 175, which is in high side position compared to the HB lighting module 160.1. Preferably, the third protection diode 175 is located between the pin 195.1 of the headlamp 180 and the HB lighting module 160.1.

This allows to maintain the LB function when the pin 195.1 is short-circuited to the ground, because the third protection diode 175 forces the current to flow through the second series 130.2 of LEDs.

FIG. 2 shows a light assembly implementing three lighting functions or more, according to one embodiment of the invention.

In addition to the two lighting functions described above, the light assembly 100 may be arranged to implement at least a third function. To this end, the light assembly 100 may comprise a third lighting module 160.3, which may comprise a third series of LEDs, not represented on FIG. 2. To power the third function, a third power output, such as a third voltage V3 is provided between two additional pins 190.6 and 190.7 by the first driver 110.1.

The two additional pins 190.6 and 190.7 are connected to the third lighting module 160.3, via two pins 195.4 and 195.5 of the headlamp 180. Alternatively, the third lighting module 160.3 may be outside of the headlamp 180 and may be directly connected to the two additional pins 190.6 and 190.7.

The third lighting function can be a Daytime Running Light, DRL, function. Alternatively, the third lighting function can be a Position Lighting PL function.

According to another embodiment, both DRL and PL functions can be performed by the third lighting module 160.3. This allows to perform several functions without adding new components to the light assembly 100. Alternatively, the third lighting function may be a Turn Indicator, TI, function, a fog lighting function, or any other lighting/signaling function.

Activation and deactivation of the third lighting module 160.3 can be performed via a third switching unit 150.3, connected in series with the third lighting module 160.3. For example, the third switching unit 150.3 can be a high side switch, located between the first driver 110.1 and the additional output pin 190.6 connected to the plus terminal of the third lighting module 160.3. The third switching unit 150.3 can be controlled by an external control unit that is not shown on FIG. 2.

The first driver 110.1 may be able to vary the third power output, such as the third voltage V3 depending on the function to be performed, such as DRL or PL. For example, a first power value can be used for PL while a second power value may be used for DRL. The first power value may be less than the second power value, which allows to avoid glaring other drivers at night time, and to ensure that the vehicle is visible at day time. This improves the security associated with the lighting functions and also optimizes the power consumption of the light assembly 100. Alternatively, different power values can be provided to the PL and DRL functions:

varying the number of lighting units 140 between the two lighting functions; or controlling the third switching unit 150.1 using PWM.

The first driver 110.1 may power more than three functions, for example by using additional outputs of the first driver 110.1 and adding other additional pins to the driver block 110.

The embodiment of FIG. 2 enables to reduce the costs associated with the light assembly as all the functions are powered by a unique driver.

FIG. 3 shows a light assembly implementing three lighting functions or more, according to another embodiment of the invention.

As for FIG. 2, the light assembly 100 comprises the third lighting module 160.3. However, instead of being powered by the first driver 110.1, the lighting module 100 may comprise a second driver 110.2 dedicated to the third lighting function.

To this end, the second driver 110.2 may be connected in parallel to the first driver 110.1 to the power source 120 and the source power input, such as source voltage Vs, is provided to the second driver 110.2 via two additional input pins 190.8 and 190.9 of the driver block 110.

As explained above, the third lighting function can be a Daytime Running Light, DRL, function. Alternatively, the third lighting function can be a Position Lighting PL function.

According to another embodiment, both DRL and PL functions can be performed by the third lighting module 160.3.

Activation and deactivation of the third lighting module 160.3 can be controlled by the second driver 110.2 via an enable signal, for example by controlling the power output by the second driver 110.2.

Alternatively, activation and deactivation can be performed via a third switching unit 150.3, connected in series with the third lighting module 160.3. For example, the third switching unit 150.3 can be a high side switch, located between the second driver 110.2 and the additional output pin 190.6 connected to the plus terminal of the third lighting module 160.3.

In the embodiment described when referring to FIG. 3, the functions HB, LB and DRL can be activated at the same time and the functions LB and DRL can also be activated at the same time, which is advantageous during overtaking.

Alternatively, when the second function is the PL function instead of the DRL function or in addition to the DRL function, the functions LB, HB and PL, can be activated at the same time and the functions LB and DRL can be activated at the same time, which is advantageous during night time.

By using two separate drivers for controlling different sets of lighting functions, it allows a more flexible combination of lighting functions in the light assembly 100. A first external control unit, which is not represented, can be used to control both switching units 150.1 and 150.2.

Another advantage of using separate drivers for different sets of functions, is that the sets of functions are controlled independently.

In the embodiments described above, the drivers 110.1 and 110.2 may encompass any technology that is able to convert an input power into an output power different from the input power. The power input and power output may differ by their type (DC or AC) and/or by their values (two DC power outputs having different values). For example, the drivers may be electronic circuitries, such as Single Ended Primary Inductor Converters, SEPICs. However, no restriction is attached to the circuitry used as the drivers 110.1 and 110.2, which can encompass other examples, such as buck converters, boost converters and/or buck-boost converters.

It is also to be noted that a first technology can be used for the first driver 110.1 and a second technology, different from the first one, can be used for the second driver 110.2.

The first, second and third switching units 150.1, 150.2 and 150.3 described above can be dynamically controlled to perform Pulse Width Modulation, which enables to adapt the power respectively provided to the first and second lighting module (LB and HB functions), to the second lighting module (LB function) or to the third lighting module (DRL/PL, TI, fog lighting function). This allows to increase the flexibility associated with the lighting functions. The power can for example be adapted to external conditions, such as brightness for example.

Also when the switching units are controlled in PWM, the power outputs, such as the voltages V1, V2 and V3 can be fixed values. Then, to vary the power applied to the lighting functions, PWM is applied to their respective switching units.

To perform PWM, an external control unit may control the switching units. This external control unit, which is not represented on the figures, is well known and is not further described. The control unit may be integrated in the driver block 110.

The present invention is not limited to the embodiments described above as examples: it extends to other alternatives.

The invention claimed is:

1. A light assembly comprising:
   a power source;
   a first lighting module configured to perform a high beam function;
   a second lighting module configured to perform a low beam function;
   a driver connected to the power source;
   wherein:
   the driver is connected to a first pin, a second pin and a third pin and is configured to provide a first power output between the second pin and the third pin and to provide a second power output between the first pin and the third pin;
   the first lighting module is connected between the first pin and the second pin and the second lighting module is connected between the second pin and the third pin;
   the light assembly comprises a first switching unit in series with the first lighting module and the second module, and a second switching unit in series with the second lighting module.

2. The assembly according to claim 1, wherein the first switching unit is between the driver and the first pin and the second switching unit is between the driver and the second pin.

3. The assembly according to claim 2, wherein the first lighting module comprises a first series of LEDs and the second lighting module comprises a second series of LEDs.

4. The assembly according to claim 2, wherein the first and second lighting modules are included in a headlamp.

5. The assembly according to claim 2, further comprising a third lighting module configured to perform a position lighting function and/or a daytime signaling function.

6. The assembly according to claim 2, wherein the first switching unit and/or the second switching unit is controlled by Pulse Width Modulation, PWM, signals to vary the power provided to the first and second lighting modules, and/or to the second lighting module, respectively.

7. The assembly according to claim 1, wherein the first lighting module comprises a first series of LEDs and the second lighting module comprises a second series of LEDs.

8. The assembly according to claim 7, wherein the first lighting module comprises a first protection diode in parallel to the first series of LEDs and mounted in reverse, and/or the second lighting module comprises a second protection diode in parallel to the second series of LEDs and mounted in reverse.

9. The assembly according to claim 8, further comprising a third protection diode between the first switching unit and the first lighting module.

10. The assembly according to claim 9, wherein the third protection diode is inside the headlamp.

11. The assembly according to claim 7, wherein the first and second lighting modules are included in a headlamp.

12. The assembly according to claim 7, further comprising a third lighting module configured to perform a position lighting function and/or a daytime signaling function.

13. The assembly according to claim 1, wherein the first and second lighting modules are included in a headlamp.

14. The assembly according to claim 13, wherein the third protection diode is inside the headlamp.

15. The assembly according to claim 1, further comprising a third lighting module configured to perform a position lighting function and/or a daytime signaling function.

16. The assembly according to claim 15, wherein the driver is further configured to apply a third power output between two additional pins, to which the third lighting module is connected.

17. The assembly according to claim 16, further comprising a third switching unit in series with the third lighting module.

18. The assembly according to claim 15, wherein the driver is a first driver and wherein the assembly further comprises a second driver arranged for applying a third power output to the third lighting module.

19. The assembly according to claim 18, further comprising a third switching unit in series with the third lighting module.

20. The assembly according to claim 1, wherein the first switching unit and/or the second switching unit is controlled by Pulse Width Modulation, PWM, signals to vary the power provided to the first and second lighting modules, and/or to the second lighting module, respectively.

* * * * *